Nov. 29, 1966  B. LONG  3,288,584
METHOD OF MAKING A MULTICELLULAR VITREOUS
SHEET ON A MOLTEN METAL BATH
Filed April 29, 1964
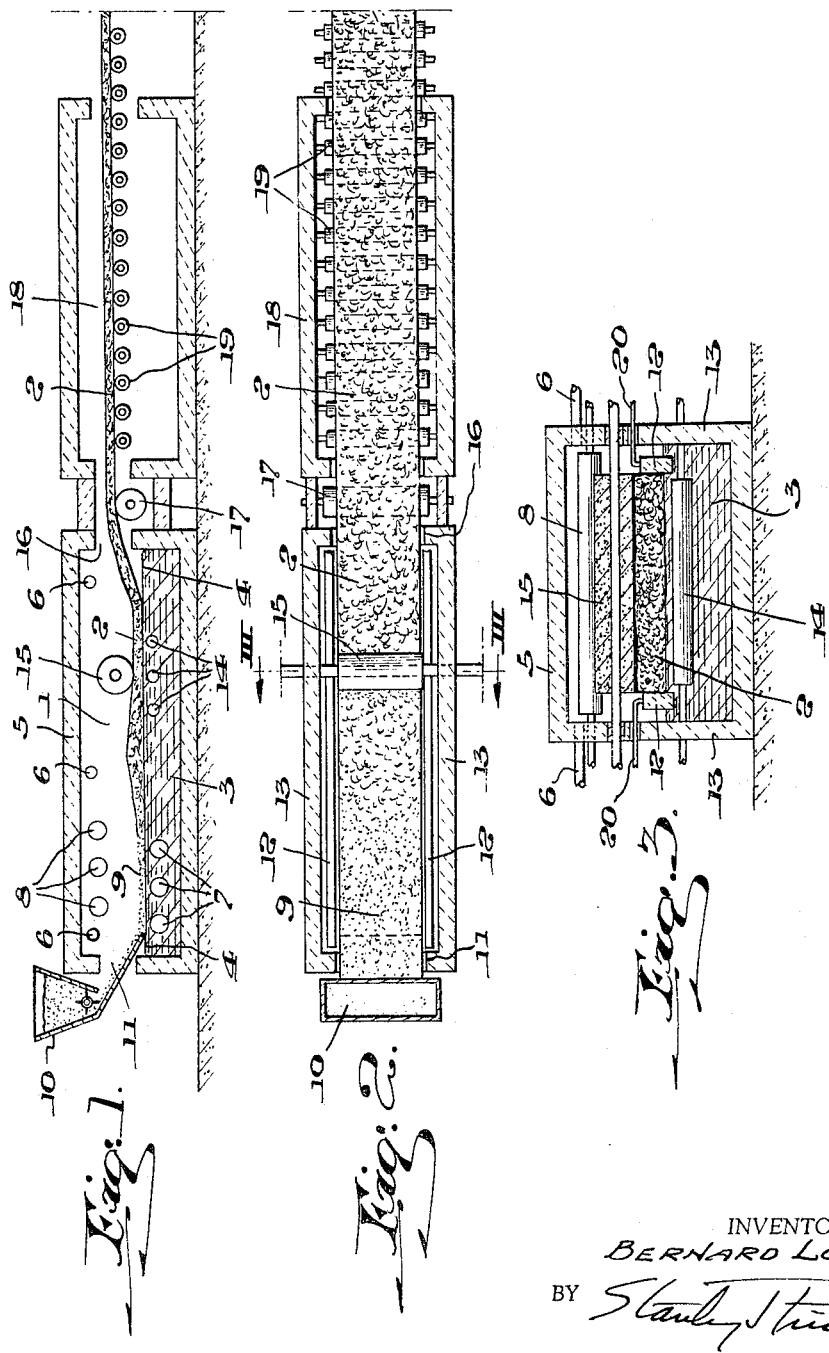
INVENTOR.
BERNARD LONG.
BY
HIS ATTORNEY United States Patent Office 3,288,584
Patented Nov. 29, 1966

3,288,584
METHOD OF MAKING A MULTICELLULAR VITREOUS SHEET ON A MOLTEN METAL BATH
Bernard Long, Paris, France, assignor to Pittsburgh Corning Corporation, Port Allegany, Pa., a corporation of Pennsylvania
Filed Apr. 29, 1964, Ser. No. 363,485
Claims priority, application France, May 16, 1963, 935,101
7 Claims. (Cl. 65—22)

This invention relates to an improved method of making multicellular glass and more particularly to a method of making a continuous sheet or plate of multicellular glass.

Multicellular glass is an inorganic vitreous material composed of a multitude of gaseous cells separated from one another by small glass envelopes. It is dimensionally stable, has a low density and low thermal conductivity, is impermeable to water, and resistant to fire, vermin and many other agencies. Multicellular glass is presently made in the form of cellular glass blocks, as described in U.S. Patent #2,123,536 and is used extensively as an insulating material. When the cells of the multicellular glass are opened as described in U.S. Patent #2,596,659 it is also used as an acoustic material in building structures.

Multicellular glass blocks are formed by admixing finely divided or powdered glass with a gassing or cellulating agent. The admixture is introduced into a closed mold of refractory material such as refractory stainless steel and is heated in the molds to a temperature of about 1600° F. by conveying the molds through a furnace equipped with a conveyor mechanism. The molds are maintained in the furnace until the powdered glass particles are sintered and coalesce. During the sintering of the powdered glass particles the cellulating agent reacts to form entrapped bubbles of gas in the sintered mass. The molds are slowly cooled in a cooling lehr and the formed multicellular glass blocks are removed therefrom.

In the above process the refractory molds used to form the multicellular glass blocks are expensive and require frequent repairing because of the high temperature to which they are subjected during the heating and cellulation process. It is further necessary in the above process to coat the inner surfaces of the mold with a parting agent to prevent the multicellular glass from adhering to the inner surfaces of the mold.

It has, in the past, been proposed to make a continuous strip or sheet of thick multicellular glass that is thereafter cut into plates or blocks of required length. Problems have been encountered, however, in these proposed processes by the affinity of the warm cellular glass for the metallic parts of the apparatus used in the process. The softened or sintered multicellular glass adheres to metallic parts when it comes in contact with the metallic parts during the cellulation process.

The invention herein disclosed comprises a process for making a thick plate or sheet of multicellular glass by admixing finely divided or powdered glass with a cellulating or gassing agent such as vegetable carbon or the like and introducing a continuous stream of the admixture across the horizontal surface of a molten metal bath preferably comprising tin or a tin alloy. The atmosphere above the molten metal bath is maintained in a nonoxidizing condition. An inventory of the admixture floats on the surface of the molten metal bath and the glass particles soften and coalesce. The cellulating agent reacts to from entrapped bubbles in the coalesced glass and thereby forms a continuous sheet of multicellular glass. The lateral dimension of the continuous sheet is controlled by two longitudinal guides along the sides of the molten metal bath. The guides are formed of a graphitic material so that the softened multicellular glass does not adhere thereto. The continuous plate or sheet of multicellular glass is transferred from the surface of the molten metal bath to the interior of an annealing lehr where it is cooled and gradually solidifies. At the end of the lehr the endless sheet of multicellular glass is cut transversely into blocks of desired length.

From the above description of the process several advantages are apparent. During cellulation of the continuous sheet the multicellular glass, when in a softened condition, does not adhere to the upper surface of the molten metal bath on which it is conveyed or floated, nor does the sheet adhere to the longitudinally extending lateral guides that control the lateral dimension of the sheet. It is now possible with process herein described to obtain a continuous sheet of multicellular glass that has a uniform lateral dimension and uniform thickness. The under surface of the continuous sheet is relatively smooth because the top surface of the molten metal bath on which the sheet is conveyed is relatively smooth and not oxidized. The process herein described has a substantially higher thermal efficiency than the known processes where there are substantial heat losses due to the large metallic masses used in the process for making multicellular glass blocks.

Accordingly, the principal object of this invention is to provide a continuous process for making multicellular glass sheets that has a high thermal efficiency.

Another object of this invention is to provide a continuous process for making cellular glass sheets by cellulating an admixture of powdered glass and a cellulating agent on a horizontal surface of a molten metal bath.

Another object of this invention is to provide a continuous process for making sheets of cellular glass that have a uniform lateral dimension and a uniform thickness.

Another object of this invention is to provide a continuous process for making a sheet of multicellular glass that has a smooth surface.

These and other objects and advantages of the invention will be more completely disclosed and described in the following specification, the accompanying drawings and the appended claims.

In the drawings:
FIGURE 1 is a semidiagrammatic vertical section illustrating the process for making a continuous sheet of multicellular glass.

FIGURE 2 is a top plan view of the apparatus illustrated in FIGURE 1 with the top portions of the heating and cooling chambers removed.

FIGURE 3 is a vertical transverse section taken along the lines 3—3 of FIGURE 2, illustrating the roller means for rigidifying the upper surface of the sheet of multicellular glass.

In FIGURE 1 there is diagrammatically illustrated a heating chamber 1 in which a sheet of multicellular glass 2 is formed. Within the chamber 1 there is a bath of molten metal 3 that has an upper horizontal surface 4. The molten metal bath is preferably tin or a tin alloy. Any suitable metal or alloy that serves in a molten state as a suitable heat exchange media and does not adhere to molten glass may also be used. The chamber 1 an upper portion 5 that covers the molten metal bath upper surface 4. Tubes 6 extend through the side walls 13 of the chamber 1 and supply nitrogen to the internal portion thereof so that a substantially nonoxidizing atmosphere is maintained above the upper surface of molten metal bath surface 3.

The molten metal bath 3 is heated by heating elements 7 extending laterally through and submerged in the bath 3 and by heating elements 8 mounted above the molten metal bath top surface 4. Any suitable heating means may be employed to supply heat to the molten metal bath 3 through the illustrated heating elements 7 and to the chamber 1 through heating elements 8.

An inventory of an admixture of powdered glass and a cellulating agent is stored in a distributor device 10 positioned adjacent the chamber 1. The admixture is fed through an opening 11 in the distributor 10 onto the top surface 4 of the molten metal bath 3. The admixture is fed from the distributor in a lateral elongated continuous stream onto the top surface of the molten metal bath, as is illustrated in FIGURE 2. Extending longitudinally along the sides of the molten metal bath 3 there are a pair of guides or curbs 12 formed of a graphitic material. The guides 12 extend substantially from one end of the bath to the other and are maintained adjacent the elongated walls 13 of the tank that contains the molten metal bath 3. The curbs or guides 12 are clearly illustrated in FIGURES 2 and 3.

The admixture that is fed to the molten bath top surface 4 from the distributor 10 is heated by the molten bath 3 as the admixture progresses longitudinally on the top surface of the molten metal bath. Heat by radiation is also supplied from heating elements 8 to the top surface of the admixture as it is fed onto the molten metal bath top surface. The admixture is heated as it floats or is conveyed longitudinally on the molten metal bath top surface and the particles of glass soften and coalesce. The cellulating agent forms bubbles in the coalesced admixture to thereby form multicellular glass.

The continuous plate or sheet of multicellular glass undergoes a certain hardening or rigidification as it progresses toward the outlet end portion of chamber 1. Cooling elements 14 extend laterally across the chamber 1 to accelerate the hardening or rigidification of the sheet 2. To cool and rigidify the upper surface of the multicellular glass sheet 2 there is provided a roller 15 formed of a graphitic material which also serves as a leveler roller to level the upper side of the sheet 2. The roller 15 has a tube extending therethrough through which a cooling medium is supplied to cool the roller 15.

Connected in series with the heating chamber 1 there is provided a cooling chamber or lehr 18 in which the sheet of multicellular glass is cooled. As the sheet of multicellular glass passes beneath the roller 15 it is cooled sufficiently to be further transported from the molten metal bath to the cooling chamber 18. The rigidified sheet of muticellular glass is conveyed from the heating chamber 1 over an intermediate roller 17 into the cooling chamber 18. The sheet of multicellular glass is supported in the cooling chamber by a plurality of rollers 19. As the sheet of multicellular glass proceeds through the cooling chamber 18 it is gradually cooled and hardened. The hardened sheet of multicellular glass is then withdrawn from the end portion of the cooling chamber 18 and thereafter cut transversely into blocks of a preselected dimension.

FIGURE 3 illustrates the graphitic guides 12 with their lower edge portion partially submerged in the molten metal bath 3. Adjusting bars 20 maintain the guides 12 in a preselected adjusted position and are arranged to vary the depth to which the guides 12 are submerged in the molten metal bath and also to control the lateral dimension of the continuous sheet of multicellular glass. The guides 12 are movable laterally relative to the chamber vertical walls 13 to thereby vary the width of the continuous sheet of cellular glass.

The admixture supplied to the heating chamber 1 from the distributor 10 consists essentially of a powdered glass that has been mixed with a small quantity of a cellulating agent such as carbon, silicon, carbide, limestone, talc, and the like. A typical admixture contains 99.8% of a conventional lime soda glass in powdered form having a size that passes through a 50 mesh screen and 0.2% of a cellulating agent such as vegetable carbon, pulverized to a size that passes through a 100 mesh screen.

The admixture is poured in layer form onto the molten metal bath that is at a sufficiently high temperature to soften the particles of glass. Additional heat is supplied to the heating chamber 1 by radiation through the heating elements 8 which heats the upper surface of the layer of the admixture conveyed on the top surface of the molten metal bath. The admixture softens and coalesces, and swelles or cellulates at a temperature of between 1472 and 1652° F. The admixture is heated to the cellulating temperature as it progresses longitudinally along on the top surface of the molten metal bath 3. The thickness of the expanded or cellulated continuous sheet of multicellular glass produced by the previously described process is, in general, between .8 and 3.2 inches and has an apparent density of between 0.15 and 0.25.

The sheet of multicellular glass is in a softened state as it is conveyed between the roller 15 and the molten metal bath 3. The cooling coils 14 beneath the top surface 4 of molten metal bath 3 and the cooled roller 15 cool the surfaces of the multicellular glass sheet and to an extent rigidify or harden the sheet so that it can be thereafter conveyed from the surface of the molten metal bath 4 into the cooling chamber or lehr 18. In the cooling lehr 18 the sheet of multicellular glass is slowly cooled to a temperature where the sheet is sufficiently rigid for further processing.

According to the provisions of the patent statutes, the principal, preferred construction, and mode of operation of the invention have been explained, and what is now considered to represent its best embodiment has been illustrated and described. However, it should be understood that, within the scope of the appended claims, the invention may be practiced otherwise than as specifically illustrated and described.

I claim:

1. A method of making a sheet of multicellular vitreous material from an admixture of finely divided vitreous particles and a cellulating agent which comprises, feeding said admixture at a controlled rate onto the surface of a molten metal bath, heating said admixture on said molten metal bath until said finely divided vitreous particles soften and coalesce and said cellulating agent reacts to cellulate said admixture, and thereafter cooling said cellulated admixture to form a sheet of multicellular vitreous material.

2. A method of making a sheet of multicellular glass from an admixture of finely divided glass particles and a cellulating agent which comprises, feeding said admixture onto the surface of a molten metal bath, maintaining said admixture in heat exchange relation with said molten metal bath until said finely divided glass particles soften and coalesce and said cellulating agent reacts to cellulate said admixture, and thereafter passing said cellulated admixture into a cooling chamber and slowly cooling said cellulated admixture to form a sheet of multicellular glass.

3. A method of making a sheet of multicellular glass as set forth in claim 2 which includes, heating the upper surface of said admixture while maintaining said admixture in heat exchange relation with said molten metal bath.

4. A method of making a sheet of multicellular glass as set forth in claim 2 which includes, subjecting said sheet of multicellular glass while still soft and flexible to a compressive force to provide a smooth surface for said sheet of multicellular glass.

5. A method of making a sheet of multicellular glass as set forth in claim 2 which includes, providing an elongated heating chamber for said molten metal bath, and supplying a nonoxidizing gas to said chamber above the top surface of said molten metal bath to maintain a nonoxidizing atmosphere within said chamber.

6. A method of making a sheet of multicellular glass as set forth in claim 5 which includes,
   cooling the surfaces of said sheet of multicellular glass within said heating chamber to thereby harden the surface of said sheet of multicellular glass.

7. A method of making a sheet of multicellular glass as set forth in claim 5 which includes,
   providing longitudinal guide members adjacent the longitudinal edge portions of said molten metal bath within said heating chamber,
   feeding said admixture in a continuous stream onto said molten metal bath top surface at a rate sufficient to form a sheet of multicellular glass of a preselected thickness, said stream extending across said molten metal bath between said longitudinal guide members, and
   moving said stream of said admixture along the top surface of said bath between said longitudinal guide members and forming a unitary sheet of multicellular glass having a lateral dimension substantially equal to the dimension between said longitudinal guide members.

References Cited by the Examiner
UNITED STATES PATENTS

| | | | |
|---|---|---|---|
| 2,118,707 | 5/1938 | Ingoof | 65—22 |
| 2,187,086 | 1/1940 | Koehring | 264—41 X |
| 2,191,658 | 2/1940 | Haux | 65—22 X |
| 2,310,457 | 2/1943 | Owen | 65—22 X |
| 2,322,581 | 6/1943 | Lytle | 65—22 X |
| 2,937,938 | 5/1960 | Fiedler et al. | 65—22 X |
| 3,013,924 | 12/1961 | Taff et al. | 264—47 X |
| 3,083,551 | 4/1963 | Pilkington | 65—65 |
| 3,215,516 | 11/1965 | Pilkington | 65—65 |

DONALL H. SYLVESTER, *Primary Examiner.*

G. R. MYERS, *Assistant Examiner.*